US010103380B2

United States Patent
Son et al.

(10) Patent No.: US 10,103,380 B2
(45) Date of Patent: Oct. 16, 2018

(54) CATHODE FOR LITHIUM-SULFUR BATTERY AND PREPARATION METHOD THEREFOR

(71) Applicant: LG CHEM, LTD., Seoul (KR)

(72) Inventors: Byoungkuk Son, Daejeon (KR); Minchul Jang, Daejeon (KR); Yu Mi Kim, Daejeon (KR); Gi Su Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 62 days.

(21) Appl. No.: 14/909,262

(22) PCT Filed: Aug. 14, 2014

(86) PCT No.: PCT/KR2014/007601
§ 371 (c)(1),
(2) Date: Feb. 1, 2016

(87) PCT Pub. No.: WO2015/023154
PCT Pub. Date: Feb. 19, 2015

(65) Prior Publication Data
US 2016/0190561 A1    Jun. 30, 2016

(30) Foreign Application Priority Data

Aug. 16, 2013    (KR) .................. 10-2013-0097328

(51) Int. Cl.
*H01M 4/36* (2006.01)
*H01M 4/38* (2006.01)
(Continued)

(52) U.S. Cl.
CPC .......... *H01M 4/366* (2013.01); *H01M 4/136* (2013.01); *H01M 4/1397* (2013.01); *H01M 4/38* (2013.01);
(Continued)

(58) Field of Classification Search
CPC .......... H01M 4/36; H01M 4/366; H01M 4/38; H01M 4/382; H01M 4/386; H01M 4/387;
(Continued)

(56) References Cited

U.S. PATENT DOCUMENTS 6,488,721 B1    12/2002 Carlson
7,066,971 B1     6/2006 Carlson
(Continued)

FOREIGN PATENT DOCUMENTS

EP    2 658 011 A1    10/2013
JP    2001-527274 A   12/2001
(Continued)

OTHER PUBLICATIONS

Kim, Hyea et al., Plasma-Enhanced Atomic Layer Deposition if Ultrathin Oxide Coatings for Stabilized Lithium-Sulfur Batteries, Jun. 12, 2013, Advanced Energy Materials, vol. 3, issue 10, pp. 1308-1315.*
(Continued)

*Primary Examiner* — Karie O'Neill Apicella
(74) *Attorney, Agent, or Firm* — Birch, Stewart, Kolasch & Birch, LLP

(57) ABSTRACT

The present application relates to a cathode for a lithium-sulfur battery and a method of preparing the same. A cathode for a lithium-sulfur battery according to an exemplary embodiment of the present application includes: a cathode active part including a sulfur-carbon composite; and a cathode coating layer provided on at least a portion of a surface of the cathode active part and including an inorganic oxide.

19 Claims, 2 Drawing Sheets

(51) Int. Cl.
    *H01M 4/04*      (2006.01)
    *H01M 4/58*      (2010.01)
    *H01M 4/48*      (2010.01)
    *H01M 10/052*    (2010.01)
    *H01M 4/136*     (2010.01)
    *H01M 4/62*      (2006.01)
    *H01M 4/56*      (2006.01)
    *H01M 4/1397*    (2010.01)
    *H01M 4/02*      (2006.01)

(52) U.S. Cl.
    CPC ........... *H01M 4/382* (2013.01); *H01M 4/386* (2013.01); *H01M 4/387* (2013.01); *H01M 4/48* (2013.01); *H01M 4/56* (2013.01); *H01M 4/5815* (2013.01); *H01M 4/5825* (2013.01); *H01M 4/62* (2013.01); *H01M 4/625* (2013.01); *H01M 10/052* (2013.01); *H01M 4/0409* (2013.01); *H01M 4/0416* (2013.01); *H01M 2004/021* (2013.01); *H01M 2004/028* (2013.01); *Y02T 10/7011* (2013.01)

(58) Field of Classification Search
    CPC ........ H01M 4/04; H01M 4/0409; H01M 4/56; H01M 4/58; H01M 4/5825; H01M 4/48; H01M 10/052; H01M 10/0525
    See application file for complete search history.

(56) References Cited

U.S. PATENT DOCUMENTS

| | | | |
|---|---|---|---|
| 7,081,142 B1 | 7/2006 | Carlson | |
| 2004/0029014 A1* | 2/2004 | Hwang | H01M 4/04 429/246 |
| 2004/0058246 A1 | 3/2004 | Choi et al. | |
| 2004/0101753 A1 | 5/2004 | Hwang | |
| 2013/0108899 A1 | 5/2013 | Schaefer | |
| 2013/0209885 A1 | 8/2013 | Paulson et al. | |

FOREIGN PATENT DOCUMENTS

| | | |
|---|---|---|
| JP | 2001-527276 A | 12/2001 |
| JP | 2002-075446 A | 3/2002 |
| JP | 2004-71566 A | 3/2004 |
| JP | 2004-179160 A | 6/2004 |
| JP | 2007-520867 A | 7/2007 |
| KR | 10-2004-0026207 A | 3/2004 |
| KR | 10-2005-0038254 A | 4/2005 |
| WO | WO 99/33125 A1 | 7/1999 |
| WO | WO 99/33131 A1 | 7/1999 |
| WO | WO 2005/076388 A1 | 8/2005 |
| WO | WO 2012/086196 A1 | 6/2012 |
| WO | WO 2014/182281 A1 | 11/2014 |

OTHER PUBLICATIONS

Russian Office Action for Appl. No. 2016104879 dated Nov. 22, 2016 (w/ English translation).

International Search Report for Appl. No. PCT/KR2014/007601 dated Dec. 16, 2014 (w/ English translation).

Kim, H. et al., "Plasma-Enhanced Atomic Layer Deposition of Ultrathin Oxide Coatings for Stabilized Lithium-Sulfur Batteries," Adv. Energy Mater., Jun. 12, 2013, vol. 3, issue 10, pp. 1308-1315.

Korean Office Action for Appl. No. 10-2014-0106085 dated Aug. 19, 2015 (w/ English translation).

Korean Office Action for Appl. No. 10-2014-0106085 dated Feb. 19, 2016 (w/ English translation).

Liang, C., "Carbon/Sulfur Nanocomposites and Additives for High-Energy Lithium Sulfur batteries," www1.eere.energy.gov/vehiclesandfuels/pdfs/merit_review_2012/energy_storage/es105_liang_2012_p.pdf.

Written Opinion of the International Searching Authority for Appl. No. PCT/KR2014/007601 dated Dec. 16, 2014 (w/ English translation).

Extended European Search Report for Appl. No. 14836375.7 dated Nov. 25, 2016.

Hayashi, A., et al, "All-solid-state rechargeable lithium batteries with Li2S as a positive electrode material," Journal of Power Sources, 2008, vol. 183, pp. 422-426.

Hayashi, A., et al, "Characterization of Li2S-Sis2-Li3MO3 (M=B, Al, Ga and In) oxysulfide glasses and their application to solid state lithium secondary batteries," Solid State Ionics, 2002, vol. 152-153, pp. 285-290.

\* cited by examiner

[Figure 1]
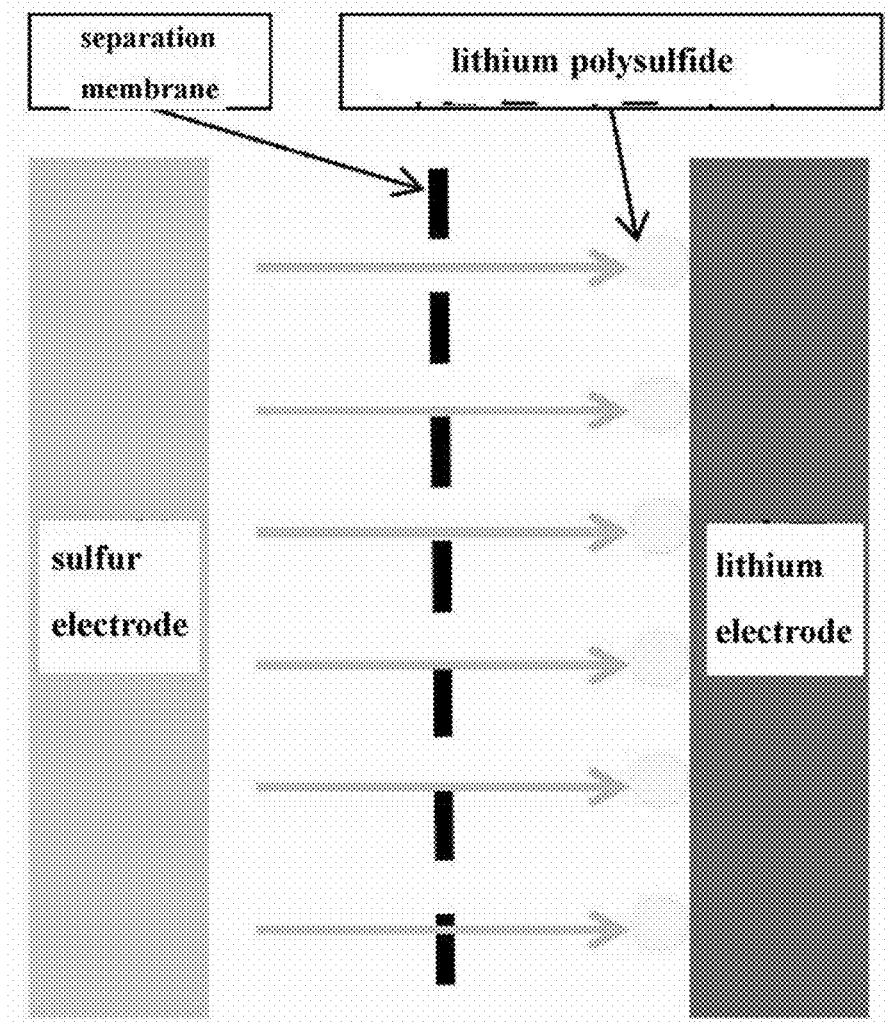

[Figure 2]
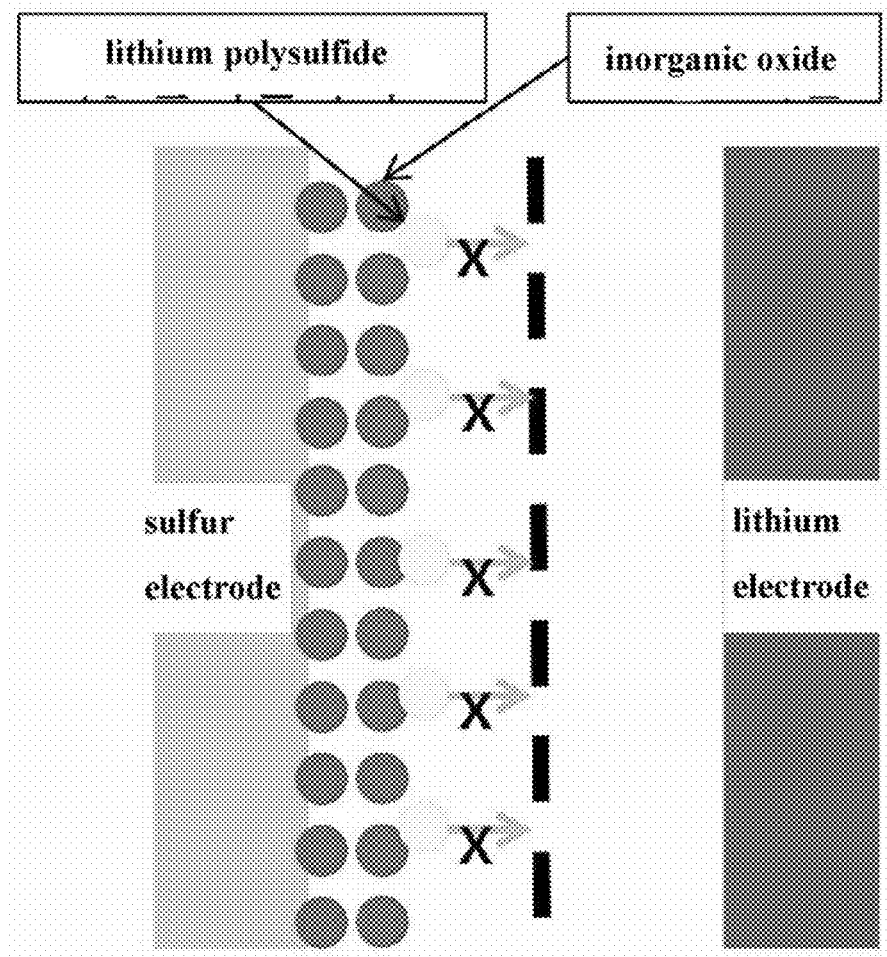

CATHODE FOR LITHIUM-SULFUR BATTERY AND PREPARATION METHOD THEREFOR

TECHNICAL FIELD

The present application claims priority from Korean Patent Application No. 10-2013-0097328 filed on Aug. 16, 2013, in the KIPO, the disclosure of which is incorporated herein by reference in its entirety.

The present application relates to a cathode for a lithium-sulfur battery and a method of preparing the same.

BACKGROUND ART

There has been considerable interest in recent years in developing high energy density batteries using lithium as an anode. Lithium metal is particularly attractive as an anode active material of an electrochemical battery because of light weight and high energy density of the metal, for example, compared to a lithium-intercalated carbon anode, which increases the weight and volume of the anode to reduce the energy density of a battery due to the presence of non-electroactive materials, and other electrochemical systems having nickel or cadmium electrodes. An anode principally including a lithium metal anode or a lithium metal provides an opportunity to produce a battery which is lighter in weight and has a higher energy density than batteries such as lithium-ion, nickel metal hydride or nickel-cadmium batteries. These characteristics are highly desirable for batteries for portable electronic devices, such as mobile phones and lap-top computers, which are paid with low weighted value in terms of premium.

These types of cathode active materials for a lithium battery are publicly known, and include a sulfur-containing cathode active material including sulfur-sulfur bonds, in which high energy capacity and rechargeability are achieved from the electrochemical cleavage (reduction) and reformation (oxidation) of the sulfur-sulfur bonds.

Lithium-sulfur batteries in which an alkali metal such as lithium is used as an anode active material and sulfur is used as a cathode active material as described above have a theoretical energy density of 2,800 Wh/kg (1,675 mAh), which is much higher than those of other battery systems, and have recently been in the spotlight used for portable electronic devices due to an advantage in that sulfur is abundant as a natural resource, inexpensive, and environmentally-friendly.

A lithium in the related art is schematically illustrated in the following FIG. 1.

However, since sulfur used as a cathode active material of a lithium-sulfur battery is a non-current collector, there are problems in that it is difficult for electrons produced by an electrochemical reaction to move, sulfur leaks into the electrolyte during the oxidation-reduction reaction so that the service life of a battery deteriorates, and furthermore, when an appropriate electrolytic solution is not selected, lithium polysulfide which is a reduced material of sulfur is eluted so that lithium polysulfide may no longer participate in the electrochemical reaction.

Thus, in order to minimize the amount of lithium polysulfide which is dissolved into the electrolytic solution and impart electric conductivity characteristics to a sulfur electrode which is a non-current collector, a technology in which a composite of carbon and sulfur is used as a cathode has been developed, but an elution problem of lithium polysulfide still cannot be solved.

Therefore, there is a high need for a technology to enhance cycle characteristics by effectively blocking lithium polysulfide from leaking into the electrolyte during the discharge of a lithium-sulfur battery.

DETAILED DESCRIPTION OF THE INVENTION

Technical Problem

The present application has been made in an effort to provide a technology to enhance cycle characteristics by effectively blocking lithium polysulfide from leaking into the electrolyte during the discharge of a lithium-sulfur battery.

Technical Solution

An exemplary embodiment of the present invention provides a cathode for a lithium-sulfur battery including: a cathode active part including a sulfur-carbon composite; and a cathode coating layer provided on at least a portion of a surface of the cathode active part and including an inorganic oxide.

Another exemplary embodiment of the present invention provides a lithium-sulfur battery including: an anode including lithium metal or a lithium alloy as an anode active material; a cathode for the lithium-sulfur battery; a separator positioned between the cathode and the anode; and an electrolyte impregnated in the anode, the cathode, and the separator and including a lithium salt and an organic solvent.

Still another exemplary embodiment of the present invention provides a cathode for a lithium-sulfur battery including: forming a cathode active part including a sulfur-carbon composite; and forming a cathode coating layer including an inorganic oxide on at least a portion of a surface of the cathode active part.

Advantageous Effects

According to the present application, an outer coating layer including an inorganic oxide may be provided on at least a portion of a surface of a cathode active part including a sulfur-carbon composite to suppress a phenomenon in which the inorganic oxide is bonded to lithium polysulfide produced during the discharge and the lithium polysulfide leaks into the electrolyte, thereby enhancing cycle characteristics of the lithium-sulfur battery.

BRIEF DESCRIPTION OF DRAWINGS

FIG. 1 is a view schematically illustrating a lithium-sulfur battery in the related art.

FIG. 2 is a view schematically illustrating a lithium-sulfur battery according to an exemplary embodiment of the present application.

BEST MODE

Hereinafter, the present application will be described in more detail.

A cathode for a lithium-sulfur battery according to an exemplary embodiment of the present application includes: a cathode active part including a sulfur-carbon composite;

and a cathode coating layer provided on at least a portion of a surface of the cathode active part and including an inorganic oxide.

In an exemplary embodiment of the present application, the inorganic oxide is a hydrophilic inorganic oxide.

The hydrophilic inorganic oxide is included in a cathode active part and is bonded to hydrophilic parts of lithium polysulfide produced during the discharge, thereby suppressing a phenomenon in which lithium polysulfide where sulfur of a sulfur-carbon composite included in the cathode active part is bonded to lithium ions leaks into the electrolyte.

The inorganic oxide may include one or more selected from the group consisting of $SrTiO_3$, $SnO_2$, $CeO_2$, MgO, NiO, CaO, ZnO, $ZrO_2$, $Y_2O_3$, $Al_2O_3$, $TiO_2$, SiC, $BaTiO_3$, $HfO_2$, $Pb(Zr,Ti)O_3(PZT)$, $Pb_{1-x}La_xZr_{1-y}Ti_yO_3(PLZT, 0\leq x\leq 1, 0\leq y\leq 1)$ and $PB(Mg_3Nb_{2/3})O_3$—$PbTiO_3(PMN-PT)$, but is not limited thereto.

In an exemplary embodiment of the present application, the inorganic oxide is an inorganic oxide having lithium ion transfer capacity.

When the inorganic oxide having lithium ion transfer capacity is used, ion conductivity in an electrochemical device may be increased to enhance the performance, so that it is preferred that ion conductivity is as high as possible. Further, when the inorganic particles have a high density, there is a problem in that it is difficult to disperse the inorganic particles during the coating and the weight is also increased during the manufacture of a battery, so that it is preferred that the density is as small as possible.

In addition, an inorganic oxide having lithium ion transfer capacity is hydrophilic, and thus also has the effect of the above-described hydrophilic inorganic oxide.

The inorganic oxide having lithium ion transfer capacity may include one or more selected from the group consisting of lithium phosphate ($Li_3PO_4$), lithium titanium phosphate ($Li_xTi_y(PO_4)_3$, $0<x<2$, $0<y<1$, $0<z<3$), lithium aluminum titanium phosphate ($Li_xAl_yTi_2(PO_4)_3$, $0<x<2$, $0<y<1$, $0<z<3$), $(LiAlTiP)_xO_y$-based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2(Li_xSi_yS_z$, $0<x<3$, $0<y<2$, $0<z<4$)-based glass and $P_2S_5$ ($Li_xP_yS_z$, $0<x<3$, $0<y<3$, $0<z<7$)-based glass, but is not limited thereto.

The $(LiAlTiP)_xO_y$-based glass may be $14Li_2O$-$9Al_2O_3$-$38TiO_2$-$39P_2O_5$, the lithium germanium thiophosphate may be $25Ge_{0.25}P_{0.75}S_4$, the lithium nitride may be $Li_3N$, the $SiS_2$-based glass may be $Li_3PO_4$—$Li_2S$—$SiS_2$, and the $P_2S_5$-based glass may be LiI—$Li_2S$—$P_2S_5$.

In an exemplary embodiment of the present application, the inorganic oxide may include one or more selected from the group consisting of $SrTiO_3$, $SnO_2$, $CeO_2$, MgO, NiO, CaO, ZnO, $ZrO_2$, $Y_2O_3$, $Al_2O_3$, $TiO_2$, SiC, $BaTiO_3$, $HfO_2$, $Pb(Zr,Ti)O_3(PZT)$, $Pb_{1-x}La_xZr_{1-y}Ti_yO_3(PLZT, 0<x<1, 0<y<1)$, $PB(Mg_3Nb_{2/3})O_3$—$PbTiO_3(PMN-PT)$, lithium phosphate ($Li_3PO_4$), lithium titanium phosphate ($Li_xTi_y(PO_4)_3$, $0<x<2$, $0<y<1$, $0<z<3$), lithium aluminum titanium phosphate ($Li_xAl_yTi_z(PO_4)_3$, $0<x<2$, $0<y<1$, $0<z<3$), $(LiAlTiP)_xO_y$-based glass) ($0<x<4$, $0<y<13$), lithium lanthanum titanate ($Li_xLa_yTiO_3$, $0<x<2$, $0<y<3$), lithium germanium thiophosphate ($L_xGe_yP_zS_w$, $0<x<4$, $0<y<1$, $0<z<1$, $0<w<5$), lithium nitride ($Li_xN_y$, $0<x<4$, $0<y<2$), $SiS_2(Li_xSi_yS_z$, $0<x<3$, $0<y<2$, $0<z<4$)-based glass and $P_2S_5(Li_xP_yS_z$, $0<x<3$, $0<y<3$, $0<z<7$)-based glass, but is not limited thereto.

In an exemplary embodiment of the present application, the sulfur-carbon composite may be formed by applying sulfur particles on porous carbon.

In addition, in an exemplary embodiment of the present application, the sulfur-carbon composite may be formed by melting sulfur particles and mixing the particles with carbon.

In an exemplary embodiment of the present application, the weight ratio of carbon:sulfur of the sulfur-carbon composite may be 1:20 or more and 1:1 or less.

The carbon may be crystalline or amorphous carbon and is not limited as long as the carbon is a conductive carbon, and may be, for example, graphite, carbon black, activated carbon fiber, non-activated carbon nanofiber, carbon nanotube, carbon fabric and the like.

In an exemplary embodiment of the present application, the cathode coating layer may include pores.

The pores may be pores having an average diameter of 0.5 μm to 10 μm.

When the pores of the cathode coating layer have an average diameter of 0.5 μm or more, the area of the inorganic oxide included in the cathode coating layer which attracts lithium polysulfide eluted from the sulfur-carbon composite included in the cathode active part during the discharge of the lithium-sulfur battery is so sufficient that characteristics and capacity of the lithium-sulfur battery are increased, and when the pores of the cathode coating layer have an average diameter of 10 μm or less, lithium ions easily move toward the cathode during the charge of the lithium-sulfur battery, thereby reducing the charging time.

The porosity of the cathode coating layer may be 20% to 70% based on the total volume of the cathode for a lithium-sulfur battery. More specifically, the porosity of the cathode coating layer may be 50% to 70% based on the total volume of the cathode for a lithium-sulfur battery.

In an exemplary embodiment of the present application, the thickness of the cathode active part may be 20 μm to 100 μm, but is not limited thereto. Furthermore, the thickness of the cathode coating layer may be 0.01 μm to 20 μm and 0.1 μm to 5 μm, but is not limited thereto.

In an exemplary embodiment of the present application, the cathode coating layer may be provided on the entire surface of the cathode active part.

In an exemplary embodiment of the present application, the form of the cathode for a lithium-sulfur battery may be a plate type or a rod type.

When the form of the cathode for a lithium-sulfur battery is a plate type, it is preferred that the cathode coating layer is positioned on a portion of the surface of the cathode active part, which is exposed to the electrolyte.

When the form of the cathode for a lithium-sulfur battery is a rod type, it is preferred that the cathode coating layer is positioned on the entire surface of the cathode active part.

In an exemplary embodiment of the present application, the content of the inorganic oxide of the cathode coating layer may be 0.5 wt % to 10 wt % based on the total weight of the sulfur-carbon composite of the cathode active part.

In an exemplary embodiment of the present application, the cathode active part may additionally include one or more additives selected from transition metal elements, IIIA Group elements, IVA Group elements, sulfur compounds of these elements, and alloys of these elements and sulfur.

The transition metal element includes Sc, Ti, V, Cr, Mn, Fe, Co, Ni, Cu, Zn, Y, Zr, Nb, Mo, Tc, Ru, Rh, Pd, Os, Ir, Pt, Au, Hg and the like, the IIIA Group element includes Al, Ga, In, Ti and the like, and the IVA Group element includes Ge, Sn, Pb and the like.

The cathode active part may additionally include a cathode active material, or optionally along with an additive, an electrically conducting conductive material for facilitating the movement of electrons in the cathode, and a binder for attaching the cathode active material to a current conductor well.

The conductive material is not particularly limited, but a graphite-based material such as KS6, a conducting material such as a carbon-based material such as Super-P, denka black and carbon black or a conducting polymer such as polyaniline, polythiophene, polyacetylene, and polypyrrole may be used either alone or in mixture.

As the binder, it is possible to use poly(vinyl acetate), polyvinyl alcohol, polyethylene oxide, polyvinyl pyrrolidone, alkylated polyethylene oxide, crosslinked polyethylene oxide, polyvinyl ether, poly(methyl methacrylate), polyvinylidene fluoride, a copolymer of polyhexafluoropropylene and polyvinylidene fluoride (trade name: Kynar), poly(ethyl acrylate), polytetrafluoroethylene polyvinyl chloride, polyacrilonitrile, polyvinyl pyridine, polyvinylidene fluoride, polystyrene, derivatives, blends and copolymers thereof and the like.

The binder may be added in an amount of 0.5 wt % to 30 wt % based on the total weight of the cathode active part. When the content of the binder is less than 0.5 wt %, there is a problem in that physical properties of the cathode deteriorate and the active material and the conductive material in the cathode are detached, and when the content exceeds 30 wt %, the ratio of the active material and the conductive material is relatively reduced at the cathode and the battery capacity may be reduced, which is not preferred.

The present application provides a lithium-sulfur battery including the above-described cathode for a lithium-sulfur battery. The lithium-sulfur battery according to an exemplary embodiment of the present includes: an anode including lithium metal or a lithium alloy as an anode active material; a cathode for the lithium-sulfur battery; a separator positioned between the cathode and the anode; and an electrolyte impregnated in the anode, the cathode, and the separator and including a lithium salt and an organic solvent.

The cathode for a lithium-sulfur battery may be present on a portion or the entire portion of the surface of the cathode active part, which is a position in which the outer coating layer is closest to the cathode active part including the sulfur-carbon composite. Due to the structure of the cathode for a lithium-sulfur battery, lithium polysulfide produced from the sulfur-carbon composite of the cathode active part by bonding sulfur to lithium ions during the discharge is suppressed from being eluted before reaching the electrolyte. Accordingly, in the lithium-sulfur battery according to the present application, cycle characteristics are enhanced compared to a lithium-sulfur battery having a structure in which the cathode is directly exposed to the electrolyte, thereby enhancing the service life of the battery.

The separator positioned between the cathode and the anode is capable of separating or isolating the cathode and the anode, and transporting lithium ions between the cathode and the anode, and may be composed of a porous non-conducting or isolating material. The separator may be an independent member such as a film, and may be a coating layer added to the cathode and/or the anode.

Examples of a material constituting the separator include polyolefin such as polyethylene and polypropylene, a glass fiber filter paper and a ceramic material, but the material is not limited thereto, and the thickness may be about 5 μm to about 50 μm, specifically, about 5 μm to about 25 μm.

In an exemplary embodiment of the present application, the lithium salt may include one or more selected from the group consisting of LiSCN, LiBr, LiI, $LiPF_6$, $LiBF_4$, $LiSO_3CF_3$, $LiClO_4$, $LiSO_3CH_3$, $LiB(Ph)_4$, $LiC(SO_2CF_3)_3$ and $LiN(SO_2CF_3)_2$, but is not limited thereto.

The concentration of the lithium salt may be about 0.2 M to about 2.0 M according to various factors such as the exact composition of the electrolyte solvent mixture, the solubility of the salt, the conductivity of the dissolved salt, charge and discharge conditions of the battery, working temperature and other factors publicly known in the lithium battery field. Examples of the lithium salt to be used in the present specification may include one or more selected from the group consisting of LiSCN, LiBr, LiI, $LiPF_6$, $LiBF_4$, $LiSO_3CF_3$, $LiClO_4$, $LiSO_3CH_3$, $LiB(Ph)_4$, $LiC(SO_2CF_3)_3$ and $LiN(SO_2CF_3)_2$, but are not limited thereto.

In an exemplary embodiment of the present specification, the lithium alloy as the anode active material may be an alloy of lithium and metal selected from the group consisting of Na, K, Rb, Cs, Fr, Be, Mg, Ca, Sr, Ba, Ra, Al and Sn.

In an exemplary embodiment of the present specification, the organic solvent may be a single solvent or a mixed organic solvent of two or more solvents.

When the mixed organic solvent of two or more solvents is used, it is preferred that one or more solvents are selected from two or more groups of a weak polar solvent group, a strong polar solvent group and a lithium metal protection solvent group, and used.

The weak polar solvent is defined as a solvent having a dielectric constant less than 15, which may dissolve the sulfur element in the aryl compound, bicyclic ether and a non-cyclic carbonate, and the strong polar solvent is defined as a solvent having a dielectric constant more than 15, which may dissolve lithium polysulfide in bicyclic carbonate, a sulfoxide compound, a lactone compound, a ketone compound, an ester compound, a sulfate compound, and a sulfite compound, and the lithium metal protection solvent is defined as a solvent which forms a stable solid electrolyte interface (SEI) on a lithium metal such as heterocyclic compounds including saturated ether compounds, unsaturated ether compounds, or N, O, S, or a combination thereof, and which has a charge-discharge cycle efficiency of at least 50%.

Specific examples of the weak polar solvent include xylene, dimethoxyethane, 2-methyltetrahydrofuran, diethyl carbonate, dimethyl carbonate, toluene, dimethyl ether, diethyl ether, diglyme, tetraglyme and the like, but are not limited thereto.

Specific Examples of the strong polar solvent include hexamethyl phosphoric triamide, γ-butyrolactone, acetonitrile, ethylene carbonate, propylene carbonate, N-methylpyrrolidone, 3-methyl-2-oxazolidone, dimethyl formamide, sulfolane, dimethyl acetamide, dimethyl sulfoxide, dimethyl sulfate, ethylene glycol diacetate, dimethyl sulfite, ethylene glycol sulfite and the like, but are not limited thereto.

Specific examples of the lithium protection solvent include tetrahydrofuran, ethylene oxide, dioxolane, 3,5-dimethylisoxazole, furan, 2-methyl furan, 1,4-oxane, 4-methyldioxolane and the like, but are not limited thereto.

The lithium-sulfur battery according to an exemplary embodiment is schematically illustrated in the following FIG. 2. According to the present application, an outer coating layer including an inorganic oxide may be provided on at least a portion of a surface of a cathode active part including a sulfur-carbon composite to suppress a phenomenon in which the inorganic oxide is bonded to lithium polysulfide produced during the discharge and the lithium polysulfide leaks into the electrolyte, thereby enhancing cycle characteristics of the lithium-sulfur battery.

The present application provides a battery module including the lithium-sulfur battery as a unit cell.

The battery module may be specifically used as a power source for an electric vehicle, a hybrid electric vehicle, a plug-in hybrid electric vehicle or a power storage apparatus.

The present application provides a method of preparing a cathode for a lithium-sulfur battery. The method of preparing a cathode for a lithium-sulfur battery according to an exemplary embodiment of the present application includes: forming a cathode active part including a sulfur-carbon composite; and forming a cathode coating layer including an inorganic oxide on at least a portion of a surface of the cathode active part.

According to an exemplary embodiment of the present application, the forming of the cathode active part may use a ball-mill process or a melt-mixing process.

In the forming of the cathode active part including the sulfur-carbon composite, after a conductive carbon and sulfur are mixed, a cathode active material slurry to which a solvent is added may be prepared, and a cathode active part may be formed using the cathode active material slurry. In this case, the cathode active material slurry may be coated on a current collector to form the cathode active part.

The solvent may be N-methyl-2-pyrrolidone, and is not limited as long as the solvent may dissolve the inorganic oxide and the binder.

According to an exemplary embodiment of the present application, a method of dip coating, die coating, comma coating, gravure coating or bar coating may be used for forming the cathode coating layer, but the method is not limited thereto.

In the forming of the cathode coating layer, a coating slurry including the inorganic oxide, the binder and a solvent may be prepared, and the cathode coating part may be coated on the surface of the cathode active part using the coating slurry, thereby forming a cathode coating layer.

The solvent may be N-methyl-2-pyrrolidone, and is not limited as long as the solvent may dissolve the inorganic oxide and the binder.

According to an exemplary embodiment of the present application, the content of the inorganic oxide may be 0.5 wt % to 10 wt % based on the total weight of the sulfur-carbon composite.

[Best Mode]

Hereinafter, the present application will be described with reference to the Examples of the present application, but the following Examples are provided for illustrating the present application, and the scope of the present application is not limited to the Examples only.

EXAMPLES

Example 1

A composite of carbon and sulfur was prepared by mixing conductive carbon having electric conductivity and sulfur in a weight ratio of 30:70 and subjecting the mixture to a ball-mill process. With respect to the total weight of a cathode active material slurry, a cathode active material slurry was prepared so as to have a composition of 70.0 g of a cathode active material including the composite, 20.0 g of Super-P as a conductive material, 10.0 g of polyvinylidene fluoride as a binder, and 500 g of N-methyl-2-pyrrolidone as a solvent, and then the slurry was coated on an aluminum current collector to prepare a cathode active part.

With respect to the total weight of a coating slurry, a coating slurry was prepared so as to have a composition of 80.0 g of $Al_2O_3$ with a size of 50 nm as an inorganic oxide, 10.0 g of polyvinylidene fluoride as a binder, and 500 g of N-methyl-2-pyrrolidone as a solvent, and then the coating slurry was coated on the surface of the cathode active part to form a cathode coating layer, thereby preparing a cathode.

In this case, the content of $Al_2O_3$ in the cathode was 1 wt % based on the total weight of the cathode, and the thickness of the cathode coating layer was 0.5 μm.

A lithium foil having a thickness of about 150 μm was used as an anode along with the cathode, dimethoxy ethane in which $LiN(CF_3SO_2)_2$ was dissolved at a concentration of 1 M and dioxolane were mixed at a volume ratio of 5:4 as an electrolyte to prepare an electrolyte, and polyolefin having a thickness of 16 μm was used as a separator, thereby preparing a lithium-sulfur battery.

Example 2

A lithium-sulfur battery was prepared in the same manner as in Example 1, except that the content of $Al_2O_3$ in the cathode was adjusted to 5 wt % based on the total weight of the cathode, and the thickness of the cathode coating layer was adjusted to 2.5 μm in Example 1.

Example 3

A lithium-sulfur battery was prepared in the same manner as in Example 1, except that the content of $Al_2O_3$ in the cathode was adjusted to 10 wt % based on the total weight of the cathode, and the thickness of the cathode coating layer was adjusted to 5 μm in Example 1.

Comparative Example 1

A lithium-sulfur battery was prepared in the same manner as in Example 1, except that coating of the cathode coating part including $Al_2O_3$ as the inorganic oxide was omitted in Example 1.

Experimental Example 1

With respect to the lithium-sulfur batteries prepared in Examples 1 to 3 and Comparative Example 1, the change in charge and discharge characteristics was tested using a charge and discharge measuring device. For the battery obtained, the capacity maintenance ratio (%) was measured at the time when 100 cycles were reached compared to the initial capacity by repeating 100 cycles of the charge and discharge each at a charge/discharge of 0.1 C/0.1 C and a charge/discharge of 0.5 C/0.5 C, and the results are shown in the following Table 1.

TABLE 1

|  | Capacity maintenance ratio (%) after 100 cycles | |
| --- | --- | --- |
|  | 0.1 C/0.1 C charge/discharge | 0.5 C/0.5 C charge/discharge |
| Example 1 | 70 | 55 |
| Example 2 | 85 | 70 |
| Example 3 | 72 | 41 |
| Comparative Example 1 | 64 | 34 |

As shown in the result, according to the present application, an outer coating layer including an inorganic oxide may be provided on at least a portion of a surface of a cathode active part including a sulfur-carbon composite to suppress a phenomenon in which the inorganic oxide is bonded to lithium polysulfide produced during the discharge and the lithium polysulfide leaks into the electrolyte, thereby enhancing cycle characteristics of the lithium-sulfur battery.

The invention claimed is:

1. A cathode for a lithium-sulfur battery comprising:
   a cathode active part comprising a sulfur-carbon composite; and
   a cathode coating layer provided on at least a portion of a surface of the cathode active part and including an inorganic oxide,
   wherein a content of the inorganic oxide of the cathode coating layer is 0.5 to 10 wt % based on a total weight of the cathode,
   wherein the cathode coating layer has a thickness of 0.1 to 20 μm,
   wherein the cathode coating layer comprises pores having an average diameter of 0.5 to 10 μm, and
   wherein a porosity of the cathode coating layer is 20 to 70% based on a total volume of the cathode for a lithium-sulfur battery.

2. The cathode for a lithium-sulfur battery of claim 1, wherein the inorganic oxide is a hydrophilic inorganic oxide.

3. The cathode for a lithium-sulfur battery of claim 2, wherein the hydrophilic inorganic oxide comprises one or more selected from the group consisting of $SrTiO_3$, $SnO_2$, $CeO_2$, MgO, NiO, CaO, ZnO, $ZrO_2$, $Y_2O_3$, $Al_2O_3$, $TiO_2$, SiC, $BaTiO_3$, $HfO_2$, $Pb(Zr,Ti)O_3$(PZT), $Pb_{1-x}La_xZr_{1-y}Ti_yO_3$ (PLZT, $0 \leq x \leq 1$, $0 \leq y \leq 1$) and $PB(Mg_3Nb_{2/3})O_3$—$PbTiO_3$ (PMN-PT).

4. The cathode for a lithium-sulfur battery of claim 1, wherein the inorganic oxide is an inorganic oxide having lithium ion transfer capacity.

5. The cathode for a lithium-sulfur battery of claim 4, wherein the inorganic oxide having lithium ion transfer capacity comprises one or more selected from the group consisting of lithium phosphate ($Li_3PO_4$), lithium titanium phosphate ($Li_xTi_y(PO_4)_3$, $0<x<2$, $0<y<1$, $0<z<3$), lithium aluminum titanium phosphate ($Li_xAl_yTi_z(PO_4)_3$, $0<x<2$, $0<y<1$, $0<z<3$), ($LiAlTiP)_xO_y$-based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2(Li_xSi_yS_z$, $0<x<3$, $0<y<2$, $0<z<4$)-based glass and $P_2S_5(Li_xP_yS_z$, $0<x<3$, $0<y<3$, $0<z<7$)-based glass.

6. The cathode for a lithium-sulfur battery of claim 1, wherein the cathode active part has a thickness of 20 to 100 μm.

7. The cathode for a lithium-sulfur battery of claim 1, wherein the cathode coating layer is provided on the entire surface of the cathode active part.

8. The cathode for a lithium-sulfur battery of claim 1, wherein the sulfur-carbon composite is formed by applying sulfur particles on porous carbon.

9. The cathode for a lithium-sulfur battery of claim 1, wherein the sulfur-carbon composite is formed by dissolving sulfur particles and mixing the sulfur particles with carbon.

10. The cathode for a lithium-sulfur battery of claim 1, wherein the cathode active part further comprises one or more additives selected from transition metal elements, IIIA Group elements, IVA Group elements, sulfur compounds of these elements, and alloys of these elements and sulfur.

11. A lithium-sulfur battery comprising:
    an anode comprising lithium metal or a lithium alloy as an anode active material;
    the cathode for a lithium-sulfur battery of claim 1;
    a separator positioned between the cathode and the anode; and
    an electrolyte impregnated in the anode, the cathode and the separator and comprising a lithium salt and an organic solvent.

12. The lithium-sulfur battery of claim 11, wherein the lithium salt comprises one or more selected from the group consisting of LiSCN, LiBr, LiI, $LiPF_6$, $LiBF_4$, $LiSO_3CF_3$, $LiClO_4$, $LiSO_3CH_3$, $LiB(Ph)_4$, $LiC(SO_2CF_3)_3$ and $LiN(SO_2CF_3)_2$.

13. The lithium-sulfur battery of claim 11, wherein the lithium alloy is an alloy of lithium and metal selected from the group consisting of Na, K, Rb, Cs, Fr, Be, Mg, Ca, Sr, Ba, Ra, Al and Sn.

14. The lithium-sulfur battery of claim 11, wherein the organic solvent is a single solvent or a mixed organic solvent of two or more solvents.

15. A battery module comprising the lithium-sulfur battery of claim 11 as a unit cell.

16. A method of preparing a lithium-sulfur battery, the method comprising:
    forming a cathode active part comprising a sulfur-carbon composite; and
    forming a cathode coating layer comprising an inorganic oxide on at least a portion of a surface of the cathode active part,
    wherein a content of the inorganic oxide of the cathode coating layer is 0.5 to 10 wt % based on a total weight of the cathode,
    wherein the cathode coating layer has a thickness of 0.1 to 20 μm,
    wherein the cathode coating layer comprises pores having an average diameter of 0.5 to 10 μm, and
    wherein a porosity of the cathode coating layer is 20 to 70% based on a total volume of the cathode for a lithium-sulfur battery.

17. The method of claim 16, wherein the forming of the coating layer uses a method of dip coating, die coating, comma coating, gravure coating or bar coating.

18. The cathode for a lithium-sulfur battery of claim 1, wherein the cathode active part further comprises a conductive material.

19. The method of preparing a lithium-sulfur battery of claim 16, wherein the cathode active part further comprises a conductive material.

* * * * *